(12) United States Patent
 Chen et al.

(10) Patent No.: US 12,596,811 B2
(45) Date of Patent: Apr. 7, 2026

(54) THREAT INTELLIGENCE SYSTEMS

(71) Applicant: Varonis Systems Inc., New York, NY (US)

(72) Inventors: Lior Chen, Tel Mond (IL); Amir Belgi, Ra'Anana (IL); Ron Sneh, Atlit (IL); John Eugene Neystadt, Kfar-Saba (IL)

(73) Assignee: Varonis Systems Inc., New York, NY (US)

( * ) Notice: Subject to any disclaimer, the term of this patent is extended or adjusted under 35 U.S.C. 154(b) by 149 days.

(21) Appl. No.: 18/642,552

(22) Filed: Apr. 22, 2024

(65) Prior Publication Data

US 2025/0328653 A1    Oct. 23, 2025

(51) Int. Cl.
 *G06F 21/57* (2013.01)
 *G06F 40/30* (2020.01)

(52) U.S. Cl.
 CPC ............ *G06F 21/577* (2013.01); *G06F 40/30* (2020.01)

(58) Field of Classification Search
 None
 See application file for complete search history.

(56) References Cited

U.S. PATENT DOCUMENTS

| | | | | |
|---|---|---|---|---|
| 10,594,713 | B2 * | 3/2020 | McLean | H04L 63/1433 |
| 2022/0004630 | A1 * | 1/2022 | Almukaynizi | G06F 21/57 |
| 2024/0203404 | A1 * | 6/2024 | Shabat | G10L 15/16 |
| 2024/0333765 | A1 * | 10/2024 | McGrew | G06F 21/552 |
| 2025/0225328 | A1 * | 7/2025 | Chowdhury | G06F 40/30 |
| 2025/0298902 | A1 * | 9/2025 | Palanki | G06F 21/577 |
| 2025/0315533 | A1 * | 10/2025 | Glynn | G06F 8/65 |

* cited by examiner

*Primary Examiner* — Raqiul A Choudhury
(74) *Attorney, Agent, or Firm* — Thorpe North & Western, LLP.

(57) ABSTRACT

A threat intelligence system utilising language models to generate queries for external threat intelligence systems, receive and filter responses, and generate alerts and reports using further language models.

20 Claims, 3 Drawing Sheets

Computing Device(s)    310

Memory Device(s)

Processor(s)

Data Store
322

Modules
324

320

312

I/O Devices
314

Networking Devices    316

318

THREAT INTELLIGENCE SYSTEMS

TECHNICAL FIELD

The following disclosure relates to a system for monitoring threats against computing systems.

BACKGROUND

A wide range of threats to the security of computing systems exist. Those threats must be monitored and acted upon to ensure the on-going security of each computer system. Threats are very wide ranging and comprise a large range of different possible attacks and risks. Threats include the existence and deployment of software to a computer system which can provide access to nefarious actors, disrupt the system operation, or leak information, the sharing or leakage of access information (usernames and passwords), and methods of fraudulently accessing a particular computing system.

Threat intelligence systems seek to assist the controllers of computing systems in monitoring for threats, and acting to mitigate them. Such systems may monitor for potential vulnerabilities of a computing system, search for the publication of access credentials, and monitor discussions of planned attacks or threats. Successful identification therefore requires a wide range of monitoring to be performed to ensure aspects are not missed. Intelligence information may exist both in the form of directly suspicious activity which can be linked to the computing system (such as usernames linked to a particular system), and also general free-language discussions between people planning an attack.

It is known to monitor for such types of intelligence, but the current systems have significant limitations which limit the ability to successfully identify and mitigate threats. Although current systems monitor a wide range of resources covering malicious activity, discussions and chatter, on both the clear and dark web, the resulting data can be very noisy due to containing false positives, mis-information and inaccuracies. Threat intelligence systems typically return large quantities of data, for example a single request may provide hundreds of megabytes of possibly relevant text which makes accurate analysis inefficient, or even impossible. Using this data without careful validation can lead to mis-allocation of resources, false accusations, and unnecessary restrictions being placed on computing systems.

Since threat intelligence systems are generally provided by third-party providers it can be challenging to integrate them into an organisation's existing security infrastructure in a way which ensures the correct information is available and can be acted upon efficiently.

There are also a wide range of technical challenges relating to the ability of an organisation to act on the output of threat intelligence services. For example, to be able to act efficiently, delivered data must be relevant to the organisation's technology systems, otherwise it is misleading or irrelevant, but connecting identified threat data to the specific technology of an organisation is challenging for external providers.

There is a risk of poor prioritisation and information overload where threat information is generated without clear basis on a particular organisation's context and priorities. This often leads to the generation and delivery of very large amounts of information which can be challenging to efficiently and accurately analyse and prioritise.

There are therefore a number of technical limitations with prior art threat intelligence systems. A number of suppliers provide monitoring tools, but each delivers different data sets and requires different technical interfaces to obtain the data. Developing a request system (for example APIs) which can transmit accurate and relevant queries to each provider, and process the response data, without extensive manual work is challenging. For example, generating key risk indicators (a technical indication of the risk of parts of the data) from large quantifies of information can be prohibitive in terms of processing required.

Each provider may return very large quantities of text within which relevant information must be identified, which presents processing difficulties. Furthermore, information within each returned data set may not be individually important, but may become important when cross-referenced to other data sets, which is not typically possible.

Data returned may be in different languages, and use slang terminology, which cannot be interpreted using conventional text searching and filtering.

These challenges are particularly acute because the analysis and reporting should be performed in near real-time while the output is still relevant and can be acted upon.

There is therefore a requirement for improved techniques for an organisation to obtain, ingest, and process threat intelligence information.

SUMMARY

The invention is defined by the following disclosure and the claims.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

The present disclosure relates to improved systems and processes for an organisation to obtain and handle threat intelligence data in a computing system.

In order to address the technical limitations of previous threat intelligence systems the current disclosure provides additional computing systems to transmit, process, and analyse data in relation to external threat intelligence data providers.

Figure 1:
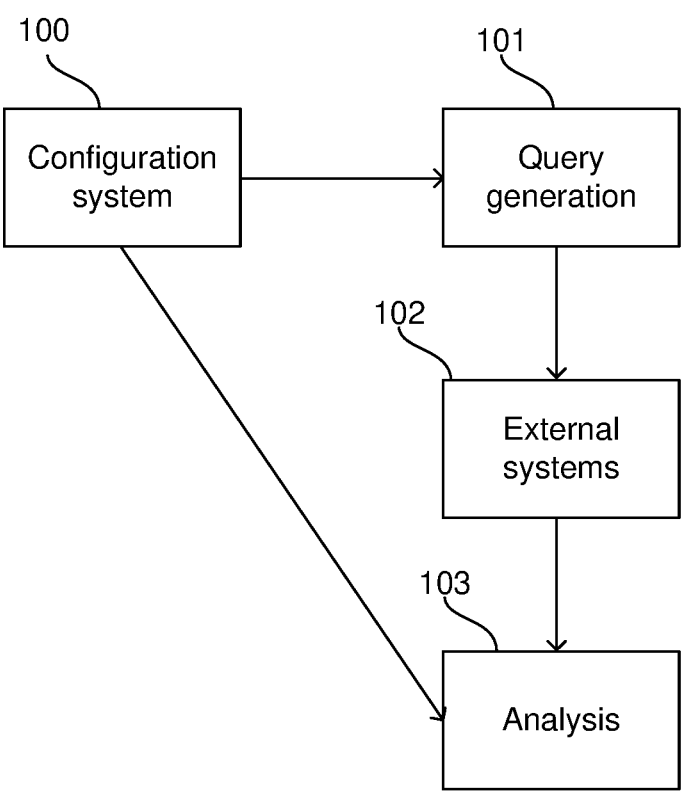
FIG. 1 shows a schematic diagram of elements of the current system.

FIG. 1 shows a schematic diagram of the main functional elements of the system. Configuration system 100 provides functionality to configure the overall system in relation to the specific organisation in which it is deployed. The configuration system 100 may include input data from the organisations systems, such as user and client data, as well as system configuration information. The configuration system 100 enables users to configure rules and details which are utilised to identify and process threat intelligence data. Two forms of rule information are created by the configuration system. Firstly, conventional free-text rules such as people or company names which can be used for text-matching (e.g. regular expression matching). Secondly, embedding vectors are formed from the free-text rules, which embedding vectors represent the semantics of the free-text. The embedding vectors may be stored as vectors in a vector database, with each vector representing a section of text. The free-text rules are utilised by the query generation system to generate text (e.g. regular expression) searches for external threat intelligence systems, while the embedding vectors are utilised to compare the semantics of the returned results with the rules. The combined data set of the first and second types will be referred as the rules information.

Query generation system 101 receives the rules information from the configuration system and generates queries for transmission to external threat intelligence systems 102. The query generation system 101 may use a language model (for example an LLM) and knowledge of the external threat intelligence systems' 102 input query structure to generate queries which best represent the rules and configuration from the configuration system 100. The output rules are typically regular expression text queries which instruct the threat intelligence systems to look for certain text or text structures.

The query generation system 101 outputs the generated queries to the external threat intelligence systems 102. Results from the external threat intelligence systems are received by the analysis system 103 and stored. As well as storing the text responses from the threat intelligence systems, the responses are processed into embedding vectors representing the semantics of the responses, which may then be stored as vectors. The vectors are compared to the vectors of the rules information to identify semantic similarity between the results and the rules, for example using cosine similarity comparisons. The comparison is used to filter the results to reduce the quantity of data for further processing. The resulting data may then be analysed using a fine-tuned LLM to generate alerts and information regarding identified threats.

Figure 2:
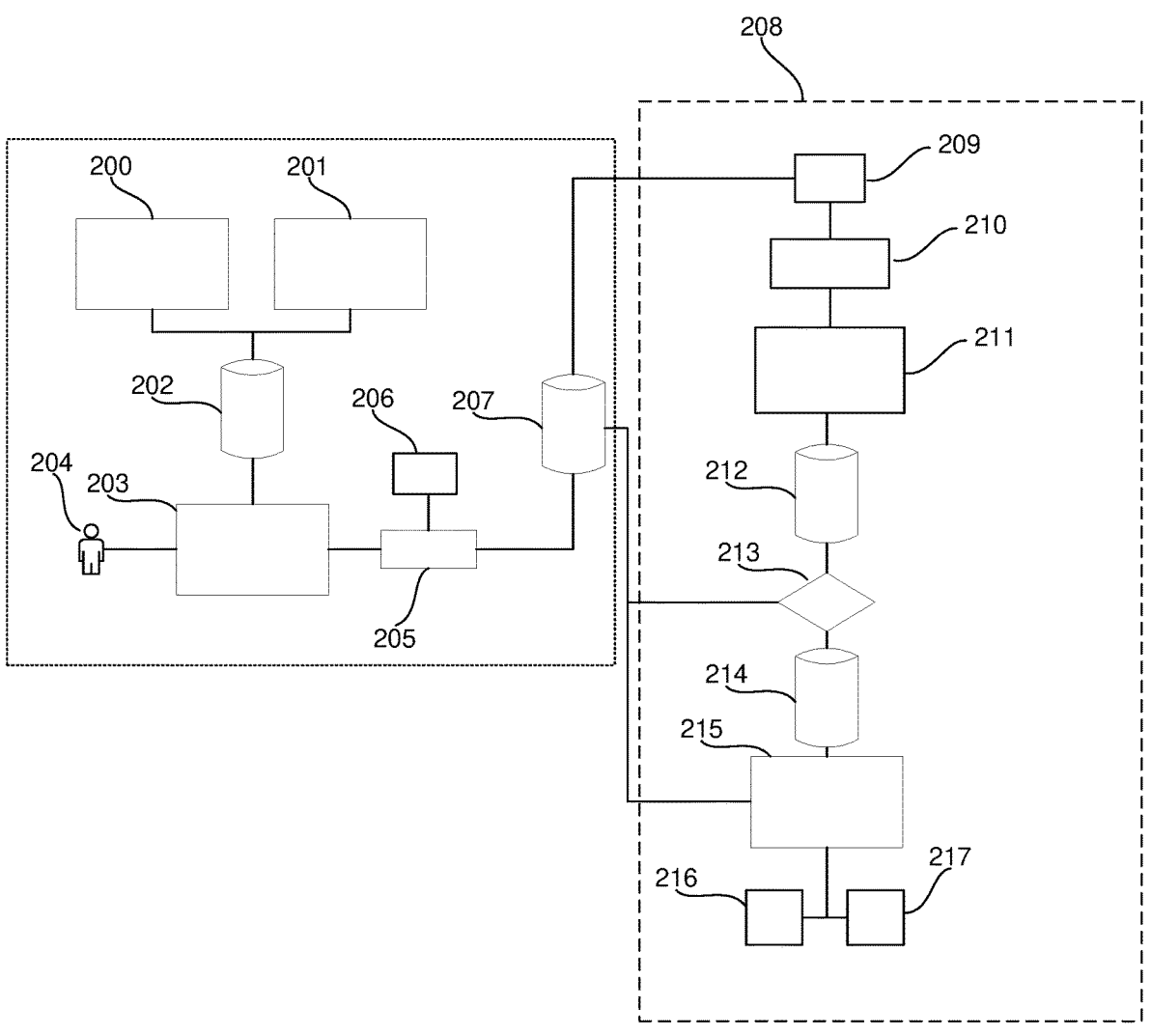
FIG. 2 shows a more detailed schematic diagram.

FIG. 2 shows a more detailed schematic representation of the system of FIG. 1. Configuration system 100 comprises a plurality of data sources comprising organisational data, such as contact details from CRM systems 200 and internal contact information from internal directories 201 such as active directory computer systems.

Such information is curated into a database 202 of organisational data which can be used by rule creation system 203 to create automated rules. For example, rule creation system 203 may create rules relating to the identities of staff members and customers. Further topics for rules created by system 203 include operating systems, computer software systems and tools used by the company (for example to identify zero-day exploits), details of contractors and sub-contractor identities, and open-source libraries in use, all of which may provide attack paths. The rules are typically text-matching rules to match provided key words from the sources 200, 201 to the data being searched, for example the rules may be created as regular expressions (regex). Rules may also be based on inputs from users 204. For example, users 204 may provide particular names, topics, domains, particular terms, and other text that are relevant to the organisation. For example, colloquial names which would not be found in official systems used to refer to the particular organisation may be useful to monitor to identify discussion of the organisation being targeted.

The generated rules and information regarding the organisation's computer systems are passed to an embedding model 205. The embedding model receives text and data, and represents that text as a set of embedding vectors representing the semantics of the text and data. The embedding vectors are vectors which can be stored in a database

207. The embedding vectors representation can be used to compare the semantics of different data sets, as will be explained in more detail below. The database 207 stores both the textual representation of the rules (e.g. regular expressions), and also the vectors representing semantics. As mentioned above the combined data set in database 207 will be referred as the rules information. The embedding model may also receive information 206 regarding the organisation's computer system structure, security domain information, and information regarding the threat intelligence provides 211 who will be used to obtain data. This context information may be used by the embedding model to improve the model's understanding of the context of the rules and improve the accuracy of the created embedding vectors.

In a development of the system of FIG. 2, prior to passing the rules to embedding model 205, the rules and information 206 may be passed to an LLM to improve the rules to include further description based on the information 206 and using RAG to generate a more detailed and/or contextual output based on the rules and information 206. Put another way the rules are enriched by a further LLM based on information 206. The enriched rules are passed to the embedding model which operates as discussed above. The expectation is that the embedding vectors from the enriched rules will provide a better similarity to relevant returned results, as explained below.

Agent system 208 performs two principle functions. Firstly it forms queries for transmission to external threat intelligence providers 211, and secondly it receives and processes responses from the external threat intelligence providers 211.

A fine-tuned LLM language model 209, receives the rules information from database 207 and generates requests 210 for one or more external threat intelligence information providers 211. The requests are formed based on the LLM's knowledge of the format and structure required by the external providers, and the examples on which it has been trained. The external providers typically require queries formed as regular expressions with which they can search relevant data sources. The requests may be in any form required by the external providers, but will typically be issued via an API, and may be in a defined query language. The LLM is trained and fine-tuned using relevant examples such that the queries best represent the intention of the rules information.

The requests are provided to the external providers 211, and the returned results are gathered into a local database 212 of the agent 208. Typical queries to threat intelligence providers result in very large returned data sets, often consisting of many megabytes of text.

The returned results processed by a further embedding model into embedding vectors representing the semantics of the returned data, as discussed above. The embedding vectors are suitable for comparison with the vectors stored in database 207. The returned data and/or the embedding vectors from the results may be stored in database 212, or may be processed directly at step 213 without storing the whole returned result set.

The embedding vectors of the returned results are compared at step 213 to the embedding vectors of the rules information in database 207. That is, the semantics of the returned results are compared to the semantics of the rules. Results with similar vectors to rules have similar semantics and may therefore be more relevant. For example, a cosine similarity comparison may be utilised to identify vectors which are similar. A similarity threshold is defined and results which exceed that threshold are stored in further database 214.

As mentioned above the threat intelligence providers generally search using regular expression matching, and return large quantities of data which can be difficult to analyse. The comparison process 213 filters the returned results based on their semantic similarity to the rules to generate a subset of the returned results which are considered most similar to the rules generated by the system at 203. The system therefore results in a search based on both text matching and semantic matching, which enables a more accurate and advanced analysis of threat data. For example, an exemplary rule might be "Discussion of James Smith (CTO of MyCompany) and passwords". The threat intelligence systems might return two sections of text (although in reality it would likely generate thousands)—(1) "Mr James Smith of MyCompany is interviewed regarding his passion for sports outside of work and how passwords can help keep team's moves secret", and (2) "I have the password of James Smith, MyCompany, which we can use to get their technical information, does anyone want to buy it". Although both of these returns match the word, the semantics are very different, and the comparison process 213 should identify that the second result has a much closer semantic similarity than the first. The returned results can therefore be effectively filtered to identify the most relevant results for further processing.

The results returned by the threat intelligence systems may be in any language. The returned text may have been identified by the threat intelligence systems due to the inclusion of a search term which is the same in more than one language. For example, company or people names are usually the same in all languages and so the text search performed by the threat intelligence systems will return results in different languages. It is also possible to include translations in the rules information to deliberately search for different languages. Furthermore, the language of returned results may be detected and the text automatically translated into a selected language to reduce the risks of missing results due to different languages. The embedding model can be fine-tuned to understand different languages, and embed the same meaning in different languages to the same embedding vectors. The comparison 213 compares the semantic representation and can therefore meaningfully compare results in languages which are different to the language of the rules, even though the actual words are different. The same principle applies to the use of slang terminology. The embedding model can be fine-tuned to map slang terms to the same embedding vectors as more formal expressions of meanings such that they can again be compared to the semantics of the rules.

The filtered results 214 are then further analysed using an additional LLM 215 to identify those results which are most relevant to the data 207 gathered by the configuration system. The LLM 215 is provided with both the results and also the rules information 207 which is interpreted together with the results. The LLM is trained and fine-tuned using example training data representing situations which can be expected.

The filtering process 213 reduces the results to a number which can be meaningfully and accurately processed by the LLM. As the input size to an LLM grows the accuracy of the LLMs output decreases, and in particular the risk of hallucinations increases. The filtering process performed on semantics to reduce the number of results, is therefore important to ensure accurate processing by the LLM. For example, typical LLMs may be limited to a few thousand input entries before they come impractical, whereas threat intelligence systems are likely to return orders of magnitude more than that in results.

Database 214 may store the filtered results for a defined period of time, or possibly indefinitely, such that results from multiple times may be analysed by LLM 215. This may be necessary because LLM are stateless (i.e. they do not have a memory) and accordingly would "forget" one run of the system if the results were not preserved. It is possible for relevant information found by the threat intelligence systems to be transitory and hence related information may not all be found on a single run of the system.

A particular advantage of LLMs is that they can relate different parts of input data together. For example, the results may include a pair of results from very different sources, making different comments, but having a target in common, and which both therefore relate to one topic. The LLM may also utilise a RAG processes based on the rules information from database 207.

The LLM generates alerts 216 based on information it identifies as being relevant to the user based on the rules information 207, and may generate guidance 217 based on the type of alerts 216 generated to guide the system users how they should react to the alerts 216. The output of the LLM is therefore user friendly in that the filter and analysis process seeks to ensure the alerts are highly relevant, and the LLM can output results in a user-friendly, human-readable manner which makes them actionable and of greater benefit to the system users.

The system may provide a mechanism for a user reviewing the alerts 216 and guidance 217 to provide feedback to the system on the accuracy or quality of the output rules and alerts. This feedback may be utilised by the LLMs 209, 217, rule creation system 203, and the embedding models to improve the quality of the output. For example, the LLMs may be fine-tuned by using the feedback from the user as training input to the language models.

The system of FIG. 2 thereby utilises a set of configurable processing systems comprising language models to identify and process threat intelligence, and present that information in a refined and actionable manner, thereby addressing the limitations of the prior art.

The use of a fine-tuned language model, particularly in two stages as included in the system of FIG. 2 to create the queries and process results, provides a number of advantages over prior art systems. Textual-based searching enables a wide range of results to be gather from a wide range of data sources which may be relevant to the organisation. Those results would be too numerous to feed directly to an LLM for generating human-actionable results, which problem is resolved by the use of the semantic similarity comparison between the results and the rules. This filtering to identify the most relevant results enables the particular advantages of a fine-tuned LLM to generate human-actionable alerts.

The effectiveness of the language models is improved by the fine-tuning process in which the language model is adapted and focused on the particular application it is being used for. In this particular application the first language model will be fine-tuned to analyze threat intelligence providers documentation and customer textual rules and create a list of API calls and queries to fetch this data, and the second language model will be fine-tuned to read a massive amount of threat intelligence data and create an actionable alert and report.

In an example the system of FIG. 1 may be deployed by a company named 'CyTech' who utilize services including Microsoft Office 365, Dropbox, Salesforce, and AWS. Their customers include financial institutions such as CityBank whose details are recorded in their CRM applications.

The textual rules defined by the users include phrases such as "O365", "Dropbox", "AWS virtual machine", "AWS PostgreSQL", "cytech", "CityBank", "Salesforce", and the names of all C-level employees. As explained above, these phrases may also be defined by an automated process. The embedding model embeds the rules as embedding vectors representing the semantics of the rules.

The first language model uses the defined rules, the relevant domain knowledge, and context to create a set of requests to the external providers (for example API calls).

The embedding model converts the returned data to vectors representing the semantics of the results, which are compared to the predefined rules stored in the vector database and irrelevant information is filtered out. In an example, cosine similarity is used to compare similarity.

The most similar data (the portion can be configured according to requirements, for example trading off risk of missing something against quantity of data to process) is passed to a further language model to identify potential threats and create alerts and reports.

The threat intelligence system may have returned many thousands of results, but the semantic comparison reduced that number and in an example returned two different conversations with a high semantic similarity to the rules. One mentions the CFO's name and that their password is too easy to guess, and a second mentions the company's name and a plan to attack their systems. The language model is able to link these two conversations based on its training and raise an alert noting the risk, and potentially including mitigation steps and points for further investigation. Furthermore the language model can still perform its task accurately if the two conversations are in different languages. As outlined above the embedding model is trained to map phrases in different languages to vectors representing the same semantic meaning. The LLM therefore performs the same analysis whether the source text is in the same or different languages. In a conventional system the two separate conversations are unlikely to be noticed in the large quantity of data returned, and if they are noted then each individually does not suggest any significant risk. The ability of the language model to link the two occurrences has thus identified a threat which may have been missed in the conventional systems.

Figure 3:
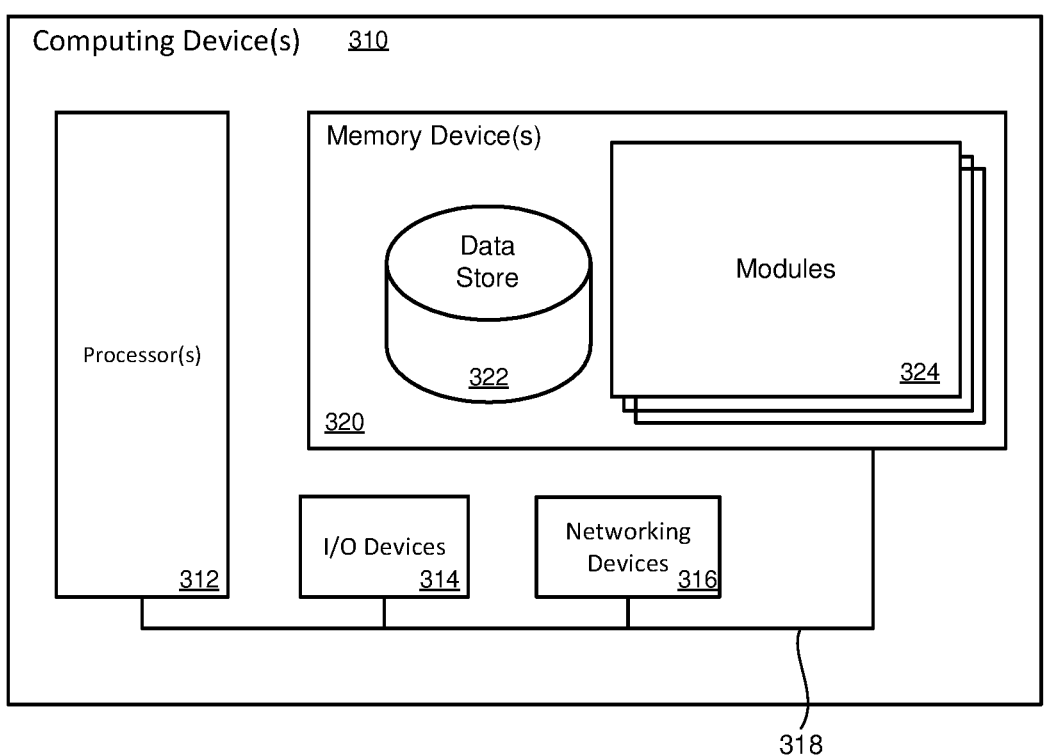
FIG. 3 shows an exemplary computing system.

FIG. 3 illustrates a computing device 310 on which modules of this technology may execute. A computing device 310 is illustrated on which a high level example of the technology may be executed. The computing device 310 may include one or more processors 312 that are in communication with memory devices 320. The computing device 310 may include a local communication interface 318 for the components in the computing device. For example, the local communication interface 318 may be a local data bus and/or any related address or control busses as may be desired.

The memory device 320 may contain modules 324 that are executable by the processor(s) 312 and data for the modules 324. In one aspect, the memory device 320 may include a checkpoint manager, a migration management module, and other modules. In another aspect, the memory device 320 may include a network connect module and other modules. The modules 324 may execute the functions described earlier. A data store 322 may also be located in the memory device 320 for storing data related to the modules 324 and other applications along with an operating system that is executable by the processor(s) 312.

Other applications may also be stored in the memory device 320 and may be executable by the processor(s) 312. Components or modules discussed in this description that may be implemented in the form of software using high-level programming languages that are compiled, interpreted or executed using a hybrid of the methods.

The computing device may also have access to I/O (input/output) devices 314 that are usable by the computing devices. Networking devices 316 and similar communication devices may be included in the computing device. The networking devices 316 may be wired or wireless networking devices that connect to the internet, a LAN, WAN, or other computing network.

The components or modules that are shown as being stored in the memory device 320 may be executed by the processor(s) 312. The term "executable" may mean a program file that is in a form that may be executed by a processor 312. For example, a program in a higher level language may be compiled into machine code in a format that may be loaded into a random access portion of the memory device 320 and executed by the processor 312, or source code may be loaded by another executable program and interpreted to generate instructions in a random access portion of the memory to be executed by a processor. The executable program may be stored in any portion or component of the memory device 320. For example, the memory device 320 may be random access memory (RAM), read only memory (ROM), flash memory, a solid state drive, memory card, a hard drive, optical disk, floppy disk, magnetic tape, or any other memory components.

The processor 312 may represent multiple processors and the memory device 320 may represent multiple memory units that operate in parallel to the processing circuits. This may provide parallel processing channels for the processes and data in the system. The local interface 318 may be used as a network to facilitate communication between any of the multiple processors and multiple memories. The local interface 318 may use additional systems designed for coordinating communication such as load balancing, bulk data transfer and similar systems.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term "comprising" or "including" does not exclude the presence of other elements. Similarly the use of the singular does not exclude the plural and vice-versa.

The term "computer" or "computing device" is used herein to refer to any computing device which can execute software and provide input and output to and from a user. For example, the term computer explicitly includes desktop computers, laptops, terminals, mobile devices, and tablets, as well as any similar or comparable devices. There is no intended difference between the terms computer, computing system or computing device, all of which fall within the same definition of computer.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable storage media or, more generally, a computer program product. The computer readable storage media, as the term is used herein, is not to be construed as storage in the form of transitory signals per se, such as radio waves or other freely propagating electromagnetic waves. The one or more computer readable storage media could be, for example, an electronic, magnetic, optical, electromagnetic, infrared, or semiconductor system, or a propagation medium for data transmission, for example for downloading the code over the Internet. Alternatively, the one or more computer readable storage media could take the form of one or more physical computer readable media such as semiconductor or solid state memory, magnetic tape, a removable computer diskette, a random access memory (RAM), a read-only memory (ROM), a rigid magnetic disc, and an optical disk.

What is claimed is:

1. A computer-implemented threat intelligence assessment system, comprising
   a data storage system comprising computer readable storage media storing identifiers based on which relevant threat intelligence information can be identified;
   one or more computer readable storage media storing program instructions and one or more processors which, in response to executing the program instructions, are configured to:
      generate a semantic representation of a set of rules and a text representation of the set of rules;
      generate, based on the semantic and/or text representation of the set of rules, using a fine-tuned LLM, a set of requests for transmission to at least one external threat intelligence provider;
      transmit the set of requests to the at least one external threat intelligence provider;
      receive, from the at least one external threat intelligence provider, a set of results based on the transmitted queries;
      generate and store a semantic representation of the set of results;
      compare the semantic representation of the results with the semantic representation of the set of rules, and filter the results to retain the most similar results; and
      process the retained results using a second fine-tuned LLM to generate actionable alerts.

2. A system according to claim 1, wherein the semantic representations are embedding vectors.

3. A system according to claim 2, wherein the embedding vectors are stored in a vector database.

4. A system according to claim 1, wherein the comparison of the semantic representation of the results with the semantic representation of the rules is performed as a cosine similarity.

5. A system according to claim 1, wherein the set of rules is generated based on user input and organisational data.

6. A system according to claim 5, wherein the organisational data includes names and data relating to members of the organisation and/or the organisation.

7. A system according to claim 5, wherein the set of rules is also generated based on context data comprising at least one of the organisation's computer system structure, security domain information, and information regarding the threat intelligence providers.

8. A system according to claim 5, wherein the rule generation utilises an LLM.

9. A system according to claim 8, wherein the LLM utilises retrieval augmented generation, based on the organisational data including names and data relating to members of the organisation and/or the organisation, and/or context data comprising at least one of the organisation's computer system structure, security domain information, and information regarding the threat intelligence providers.

10. A system according to claim 1, further comprising training one or more of the LLMs based on user feedback to the actionable alerts.

11. A system according to claim 1, wherein the retained results are retained and added to results retained from a further set of results from the at least one external threat intelligence provider.

12. A computer-implemented method, comprising the steps of
   at a data storage system comprising computer readable storage media storing identifiers based on which relevant threat intelligence information can be identified;
   at a computer system comprising one or more computer readable storage media and one or more processors: —
      generating a semantic representation of a set of rules and a text representation of the set of rules;
      generating, based on the semantic and/or text representation of the set of rules, using a fine-tuned LLM, a set of requests for transmission to at least one external threat intelligence provider;
      transmitting the set of requests to the at least one external threat intelligence provider;
      receiving, from the at least one external threat intelligence provider, a set of results based on the transmitted queries;
      generating and storing a semantic representation of the set of results;
      comparing the semantic representation of the results with the semantic representation of the set of rules, and filter the results to retain the most similar results; and
      processing the retained results using a second fine-tuned LLM to generate actionable alerts.

13. A method according to claim 12, wherein the semantic representations are embedding vectors.

14. A method according to claim 12, wherein the comparison of the semantic representation of the results with the semantic representation of the rules is performed as a cosine similarity.

15. A method according to claim 12, wherein the set of rules is generated based on user input and organisational data.

16. A method according to claim 15, wherein the organisational data includes names and data relating to members of the organisation and/or the organisation.

17. A method according to claim 15, wherein the set of rules is also generated based on context data comprising at least one of the organisation's computer system structure, security domain information, and information regarding the threat intelligence providers.

18. A method according to claim 15, wherein the rule generation utilises an LLM.

19. A method according to claim 12, further comprising training one or more of the LLMs based on user feedback to the actionable alerts.

20. A method according to claim 12, wherein the retained results are retained and added to results retained from a further set of results from the at least one external threat intelligence provider.

* * * * *